United States Patent
Park et al.

(10) Patent No.: US 9,771,824 B2
(45) Date of Patent: Sep. 26, 2017

(54) METHOD AND SYSTEM FOR AN ELECTRIC AND STEAM SUPPLY SYSTEM

(71) Applicant: General Electric Company, Schenectady, NY (US)

(72) Inventors: Cheol Park, Seongnam-si (KR); Byeong-Yeol Baek, Busan (KR); Read Stapley Tuddenham, Sandpoint, ID (US); Paul Thomas Maciulewicz, West Chester, OH (US)

(73) Assignee: General Electric Company, Schenectady, NY (US)

( * ) Notice: Subject to any disclaimer, the term of this patent is extended or adjusted under 35 U.S.C. 154(b) by 99 days.

(21) Appl. No.: 14/985,136

(22) Filed: Dec. 30, 2015

(65) Prior Publication Data
US 2017/0081972 A1 Mar. 23, 2017

Related U.S. Application Data

(60) Provisional application No. 62/222,071, filed on Sep. 22, 2015.

(51) Int. Cl.
| | |
|---|---|
| *B60L 1/02* | (2006.01) |
| *F01K 15/00* | (2006.01) |
| *F01K 17/02* | (2006.01) |
| *F02C 6/00* | (2006.01) |
| *F02C 6/18* | (2006.01) |
| *F01D 15/10* | (2006.01) |
| *F02G 5/02* | (2006.01) |
| F02C 7/00 | (2006.01) |
| F27D 17/00 | (2006.01) |
| H01M 2/38 | (2006.01) |
| H01M 8/24 | (2016.01) |

(52) U.S. Cl.
CPC .............. *F01D 15/10* (2013.01); *F02G 5/02* (2013.01)

(58) Field of Classification Search
USPC ................ 290/2; 60/783; 432/180; 429/456
See application file for complete search history.

(56) References Cited

U.S. PATENT DOCUMENTS

| | | | | |
|---|---|---|---|---|
| 5,175,063 | A | * 12/1992 | Ishihara .............. | H01M 8/0247 429/456 |
| 5,229,224 | A | * 7/1993 | Ishihara .............. | H01M 8/0232 429/454 |

(Continued)

OTHER PUBLICATIONS

MHI Develops High-Pressure Gas Supply System for Marine Engines: Bloomberg.com, Mar. 6, 2012, retrieved from website http://www.bloomberg.com/apps/news?pid=newsarchive &sid=agNxs0kW3bfQ (2pgs.).

*Primary Examiner* — Pedro J Cuevas
(74) *Attorney, Agent, or Firm* — General Electric Company; William Scott Andes (57) ABSTRACT

An electric and steam system includes an electrical generator assembly configured to receive a first portion of a flow of a boil off gas (NBOG). An oxidizing unit is configured to receive a second portion of the flow of the boil off gas (NBOG), the second portion being an excess of the flow of the boil off gas (NBOG) that the electrical generator can process, and a crossover duct configured to receive a first flow of exhaust gas from the electrical generator assembly and a second flow of exhaust gas from the oxidizing unit and channel the first and second flows to an inlet of a heat recovery steam generator.

20 Claims, 4 Drawing Sheets

(56) References Cited

U.S. PATENT DOCUMENTS

| | | | | |
|---|---|---|---|---|
| 5,273,839 A * | 12/1993 | Ishihara | ................ | H01M 8/243 |
| | | | | 429/454 |
| 5,275,556 A * | 1/1994 | Hirose | ................... | F23M 5/085 |
| | | | | 126/91 A |
| 5,292,599 A * | 3/1994 | Soma | ................... | H01M 8/0247 |
| | | | | 429/433 |
| 5,339,621 A * | 8/1994 | Tolman | ................... | C02F 1/025 |
| | | | | 110/229 |
| 5,461,853 A | 10/1995 | Vetterick | | |
| 5,647,741 A * | 7/1997 | Bunya | .................... | F23L 15/02 |
| | | | | 432/159 |
| 6,442,924 B1 | 9/2002 | Talley et al. | | |
| 7,347,345 B2 * | 3/2008 | Guerrero | ................... | A61L 2/18 |
| | | | | 134/168 C |
| 7,357,092 B2 | 4/2008 | Park | | |
| 7,694,850 B2 * | 4/2010 | Guerrero | ................... | A61L 2/18 |
| | | | | 134/168 C |
| 8,216,008 B2 | 7/2012 | Daffey | | |
| 8,492,043 B2 * | 7/2013 | Shintani | .............. | H01M 4/8668 |
| | | | | 429/433 |
| 8,614,023 B2 * | 12/2013 | Poshusta | ........... | H01M 8/04089 |
| | | | | 429/425 |
| 9,359,554 B2 * | 6/2016 | Quanci | .................... | C10B 15/02 |
| 2002/0061270 A1 * | 5/2002 | Osborne | ................ | B01D 53/60 |
| | | | | 423/210 |
| 2005/0269362 A1 * | 12/2005 | Guerrero | ................... | A61L 2/18 |
| | | | | 222/148 |
| 2007/0130952 A1 | 6/2007 | Copen | | |
| 2007/0180955 A1 * | 8/2007 | Warner | ................... | C21C 5/562 |
| | | | | 75/406 |
| 2008/0061081 A1 * | 3/2008 | Guerrero | ................... | A61L 2/18 |
| | | | | 222/148 |
| 2009/0202882 A1 * | 8/2009 | Takeguchi | .......... | H01M 8/0206 |
| | | | | 429/456 |
| 2010/0190083 A1 * | 7/2010 | Valensa | ............ | H01M 8/04007 |
| | | | | 429/458 |
| 2012/0189931 A1 * | 7/2012 | Sugawara | ................ | C01B 3/38 |
| | | | | 429/423 |
| 2013/0040216 A1 * | 2/2013 | Poshusta | ........... | H01M 8/04089 |
| | | | | 429/425 |
| 2014/0048402 A1 * | 2/2014 | Quanci | .................... | C10B 15/02 |
| | | | | 201/1 |
| 2014/0260251 A1 | 9/2014 | Shapot et al. | | |

\* cited by examiner

FIG. 1

| MODE NO. | GTG | HRSG | STG | GCU | MVAC BUS TIES |
|---|---|---|---|---|---|
| 0 | SHUT DOWN | SHUT DOWN | SHUT DOWN | PROCESSING EXCESS BOG | |
| 1 | MASTER FREQUENCY CONTROL | SLIDING PRESSURE CONTROL | SYNCHED TO GTG | PROCESSING EXCESS BOG | SHUT |
| 2 | MASTER FREQUENCY CONTROL | SLIDING PRESSURE CONTROL | MASTER FREQUENCY CONTROL | PROCESSING EXCESS BOG | OPEN |
| 3 | MASTER FREQUENCY CONTROL | BYPASSED OR WARMUP / RECIRC | OFF-LINE | PROCESSING EXCESS BOG | SHUT |
| 4* | OFF-LINE | SLIDING PRESSURE CONTROL | MASTER FREQUENCY CONTROL | EXHAUST TO HRSG | SHUT |
| 5 | MASTER FREQUENCY CONTROL EXHAUST TO HRSG BYPASS | SLIDING PRESSURE CONTROL | MASTER FREQUENCY CONTROL | EXHAUST TO HRSG | OPEN |
| 6 | MASTER FREQUENCY CONTROL EXHAUST TO HRSG BYPASS | SLIDING PRESSURE CONTROL | SYNCHED TO GTG | EXHAUST TO HRSG | SHUT |

*BLACK START AUXILIARY DIESEL GENERATOR AVAILABLE IF ADDITIONAL POWER REQUIRED.

METHOD AND SYSTEM FOR AN ELECTRIC AND STEAM SUPPLY SYSTEM

CROSS REFERENCE TO RELATED APPLICATIONS

This application claims priority to and the benefit of the filing date of U.S. Provisional Application No. 62/222,071 filed on Sep. 22, 2015, which is hereby incorporated by reference in its entirety.

BACKGROUND

The field of disclosure relates generally to combined-cycle power plants, and, more particularly, to a method and system for the capture and utilization of exhaust gas energy.

Storage tanks on at least some known liquefied natural gas (LNG) carrier vessels are not refrigerated and are not designed to withstand significant internal pressure. Therefore, LNG stored in the storage tanks boils off during transit. This is known as natural boil off gas (NBOG). The NBOG is continuously generated in the storage tanks and needs to be constantly managed to insure the safety of the vessel. The NBOG can be managed by utilizing it as a fuel source for other processes onboard the ship, or when NBOG exists in excess amounts it is oxidized (combusted) in a gas combustion unit (GCU) with the resultant heat and exhaust gas products generated vented overboard to ambient. As used herein, boil off gas (BOG) covers two gas flows, natural BOG (NBOG) and Forced BOG (FBOG).

BRIEF DESCRIPTION

In one aspect, a gas turbine-based electric and steam system includes an electrical generator assembly configured to receive a first portion of a flow of a boil off gas (BOG), an oxidizing unit configured to receive a second portion of the flow of the boil off gas (BOG), the second portion being an excess of the flow of the boil off gas (BOG) than the electrical generator assembly can process, and a crossover duct configured to receive a first flow of exhaust gas from the electrical generator assembly and a second flow of exhaust gas from the oxidizing unit and channel the first and second flows to an inlet of a heat recovery steam generator.

In another aspect, a method of operating an electrical generation system includes generating electrical energy using a first portion of a flow of a boil off gas (BOG) stream from a stored volume of liquefied natural gas (LNG) to fuel an electrical generator assembly and oxidizing a second portion of the flow of the BOG stream, the second portion being the flow of the BOG stream that exceeds a demand of the electrical generator assembly or that exceeds a capability of the electrical generator assembly. The method further includes channeling a first flow of exhaust gas from the electrical generator assembly and a second flow of exhaust gas from the oxidizing unit through a crossover duct to an inlet of a heat recovery steam generator.

In still another aspect, a shipboard electric and steam system includes a powered floating vessel and an electrical generator assembly configured to receive a first portion of a flow of a boil off gas (BOG) from the powered floating vessel. The system also includes an oxidizing unit configured to receive a second portion of the flow of the boil off gas (BOG) from the powered floating vessel, the second portion being the flow of the BOG stream that exceeds a demand of the electrical generator assembly or that exceeds a capability of the electrical generator assembly. The system also includes a crossover duct configured to receive a first flow of exhaust gas from the electrical generator assembly and a second flow of exhaust gas from the oxidizing unit and channel the first and second flows to an inlet of a heat recovery steam generator.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Embodiments of a shipboard electric and steam system positioned onboard a floating vessel, either powered or unpowered, described herein provide, for example, an LNG carrier shipboard equipment configuration that is more cost-effective than those currently available. Because natural boil off gas (NBOG) is essentially a "free" fuel source as a result of LNG carrier operations and is cleaner burning than traditional liquid fuels, additional uses for NBOG are desirous because the use of NBOG improves the economics of LNG shipping as well as reducing the environmental impact of LNG operations.

LNG carrier power and propulsion systems support a wide variety of routine ship operations. These vary in power demand, duration, and requirements for redundancy. During a typical cargo delivery cycle the ship experiences the following basic operations:

Cargo Loading: This is typically a twelve hour period where LNG is transferred from the onshore terminal's LNG storage tanks to the ship cargo tanks. If the tanks did not contain an LNG heel to maintain the cold temperatures and keep air out, tank purging and cool down would also be required and add to the time needed for cargo operations. During cargo loading, NBOG will generally not be available to fuel the power plant. In various embodiments, depending on ship type, typical electric loads are on the order of 2,500 kW to 6,000 kW.

In Port Provisioning, Bunkering and Crew Rest: The ship is idle in port except for maintenance activities, loading stores and replenishing liquid fuels and lube oil. The power levels could run from 1,500 kW to 3,500 kW, the lowest in the ship operating cycle.

Transiting In and Out of Port: The ship is underway at low speed, typically ten or twelve knots moving between the port facility and the sea buoy or open ocean. Power levels are intermediate, 3,000 kW to 13,000 kW. This is a time when maximum equipment redundancy is most important. The harbor channels can be narrow and the hazards of other harbor traffic require continuity of power. Frequently LNG carriers will have tug escorts during these operations to mitigate the risk. In addition to tug escorts, ships use tugs for turning, positioning in the channel and movement to and from the pier. During tug operations propulsion power could be 0.0 kW at times.

Open Ocean Transit: Movement between the load port sea buoy and the sea buoy at the delivery port consumes the majority of the ship time. Typically, the ship transits at or near design speed (19.5 knots) on the laden voyage and averages (15 to 17 knots) on the ballast voyage. Ship's speed is subject to weather, seas, economic, and schedule considerations. Ships generally operate at the most economic speed, which occurs when the power plant consumes all NBOG and requires no forced boil off gas (FBOG). The most economical speed varies with cargo tank size, tank boil off rate and hull resistance. Average laden voyage speeds are typically approximately eighteen knots. Open ocean transit is the part of the voyage where fuel economy is more important than redundancy. There is relatively little traffic and no concerns about depth of water. So, the ship has time to recover from an equipment failure. It also has the highest power requirement, typically between 25,000 kW and 30,000 kW. Power required for a given speed is a function of the ship design/displacement. In the case of LNG carriers, ship size is expressed by the ship cargo capacity. These values are typical of a 174,000 m³ class LNG carrier. Larger vessels would require more power and smaller vessels less power. A major difference between the laden and ballast voyages from the power plant perspective is the amount of natural boil off gas available for fuel. On the laden voyage, boil off rates run from 0.08 volume %/day to 0.15 volume %/day. Because the cargo tanks are filled to 10% or less on the ballast voyage, the natural boil-off gas (NBOG) flow rate is 40% to 45% of the flow seen on the laden voyage.

Cargo Unloading: This is the twelve hour period where the ship transfers its cargo to the shore terminal. Because the cargo tanks must remain free of air and at roughly atmospheric pressure, re-gasified LNG is provided by the delivery terminal or the ship to backfill the tanks as the LNG cargo is pumped to the terminal. Tank pressure control is important. In an example embodiment, power levels to drive the ship service loads and the cargo pumps are on the order of 8,000 kW. If the ship is providing the backfill gas, which is actually forced boil off gas (FBOG), the heating steam demand to vaporize the LNG is the highest of the ship cycle, 8 tons/hour to 10 tons/hour, depending on ship pump down rate. This is usually fulfilled by the ship's auxiliary boilers. In another embodiment, the gas turbine generator is used in simple cycle to supply the ship's electrical needs and a gas combustion unit (GCU) is operated to supply heat to a heat recovery steam generator (HRSG 116), which would then supply that heating steam demand. In another alternative embodiment, if permitted by class regulations, the GTG and the GCU are operated and each exhaust is channeled to HRSG simultaneously and the exhaust is ultimately discharged through an HRSG exhaust. The GCU can burn NBOG, FBOG, or a combination of both. In some embodiments, all BOG goes through a fuel gas compressor. In other embodiments, only the NBOG goes through the compressor. The FBOG may be pressurized in the liquid state as it is pumped out of the cargo tank. It is then vaporized under pressure and mixed with the NBOG.

Heel Out Voyage: The ship must be dry-docked periodically for inspections and maintenance. It cannot carry cargo into dock. As a result, at the delivery prior to the docking, the cargo tanks are completely pumped down, allowed to warm to ambient temperatures and gas freed. The voyages to the dock and from the dock to the load port are often referred to as "heel out" voyages. There is no heel of cargo left in the tanks. These voyages must be conducted using a liquid fuel, such as, but, not limited to, marine gas oil (MGO).

Operators will choose an operating mode of the electric and steam system that best fits the circumstances and economics at the time. They will take several factors into account in determining the operating mode.

Ship power demand determines whether the electric and steam system operates in a simple cycle mode or a combined cycle mode. Normal operation is the combined cycle mode except for in port waiting, provisioning and bunkering periods. Underway, propulsion loads are the principal power demand. In port, electrical loads may vary from 1,500 kW to 8,000 kW depending on the operations. Cargo loading and delivery require ~6,000 kW and ~8,000 kW respectively, power and propulsion plants operate most efficiently when the ship power requirement and power available (total rated power of the operating electrical generators) are matched. Gas turbine generator (GTG) efficiency increases as output power approaches the rating point. The GTG and the combined electric and steam system can operate at rated load without any duty cycle limitations, unlike diesels, which are typically "oversized" with sufficient margin to avoid duty cycle limitations. However, a few percent excess power available is generally maintained to provide margin to accept fluctuations in the ship power demand due to intermittent and cycling loads or unexpected increases in power demand. A gross thermal efficiency of the electric and steam system will exceed 40% at loads greater than 40% of the rated power. When low power operations are required, the steam cycle will mitigate the lower gas turbine efficiency down to power levels of 25% to 30% of the gas turbine rating. The GTG is a dual fuel machine in that it can burn either BOG or liquid fuel. The GCU is also dual fuel. Accordingly, the GCU is usable to provide heat to generate steam when the GTG is out of service.

System operating modes must also accommodate the status of the cargo tanks. The amount of fuel gas available without forced boil off varies between the laden and ballast voyages and with the cargo containment system used, for example, a size of the cargo tanks. The electric and steam system has the flexibility to operate anywhere in the ship operating envelope on either boil off gas or liquid fuel. Heel out voyages can be conducted at the same speeds as cargo voyages. The electric and steam system gives operators the ability to choose fuels based on the relative economic value of the fuel.

Emissions requirements are becoming more restrictive and will vary from one location to the next. In an emission control area (ECA), the electric and steam system is able to operate on either gas or liquid fuel and maintain low $SO_x$ and $NO_x$ emissions. $SO_x$ emissions are controlled through the use of low sulfur fuels such as, gas or MGO. To control $NO_x$, GTG 108 includes two combustor types capable of low $NO_x$ operation under a variety of fuels and operating conditions. Electric and steam systems configured with dry low emissions (DLE) combustors operate in a low emissions mode all the time, at all power levels and with both liquid and gas fuel. Systems configured with, for example, single annular combustors (SAC) may turn the low emissions operating mode on and off. For the latter, in an ECA, water injection may be used to reduce the formation of $NO_x$ by lowering combustor temperatures. This operating mode works for both gas and liquid fuels, although water flow rate will vary with fuel type, power level and temperature. In uncontrolled areas, the gas turbine operates without the water injection. This combustor works well when only a small fraction of the itinerary is in an emission control area. The water injection on-off feature conserves ship pure water.

The maneuvering condition or ship operating environment affects how the power and propulsion plant is operated. In high traffic areas, narrow channels and canals such as Suez or Panama, operators cannot afford a loss of power and may choose to operate two independent power sources to increase reliability, even though this represents a larger miss match in power available and power demand. Such situations typically have low power requirements. In this situation, the electric and steam system operates in combined cycle with GCU ready to supply exhaust gas to HRSG. Alternatively, GCU can be lined up as the heat source to the HRSG and the GTG operated in simple cycle mode, creating two independent sources of power. Any failure will still allow the ship to maintain electrical power and steerageway.

The electric and steam system power island gives operators another means to control cargo tank pressure. When the NBOG exceeds the requirement for fuel gas, such as, for gas turbine engines, diesel engines or other electric generators, the excess is usually directed to the gas combustion unit (GCU). If the tank pressure reaches levels requiring operator action to keep it at desired levels, the electric and steam system gives the operator the flexibility to increase speed or slow down assuming navigational requirements/operational requirements permit. Changing speed changes the rate gas is withdrawn from the cargo tanks, thus allowing the operator to limit the use of the GCU.

The configuration of the ship's electrical distribution system also influences the choice of the operating mode of the electric and steam system. STG and GTG can operate in parallel with the HRSG and steam turbine in sliding pressure control, with the steam turbine throttle valve wide open and the GTG setting the frequency. Both generators see the same load and load share with the STG taking as much load as it can and still be able to maintain speed and frequency as set by the GTG. Similarly, the loads see two sources of electrical power and don't know where their power comes from.

If the MVAC bus tie breakers are open, then the GTG and STG operate independently from an electrical perspective and each controls its own speed/frequency. Each generator has its own load. There is no load sharing when the medium voltage alternating current (MVAC) bus tie breakers are open. STG 136 controls turbine speed and hence frequency using the steam turbine throttle valve. In one embodiment, each propulsion motor is fed by two motor drives (frequency converters). Each motor receives power from both the GTG and the STG. This permits equal power available to each shaft during split plant operation.

Figure 1:
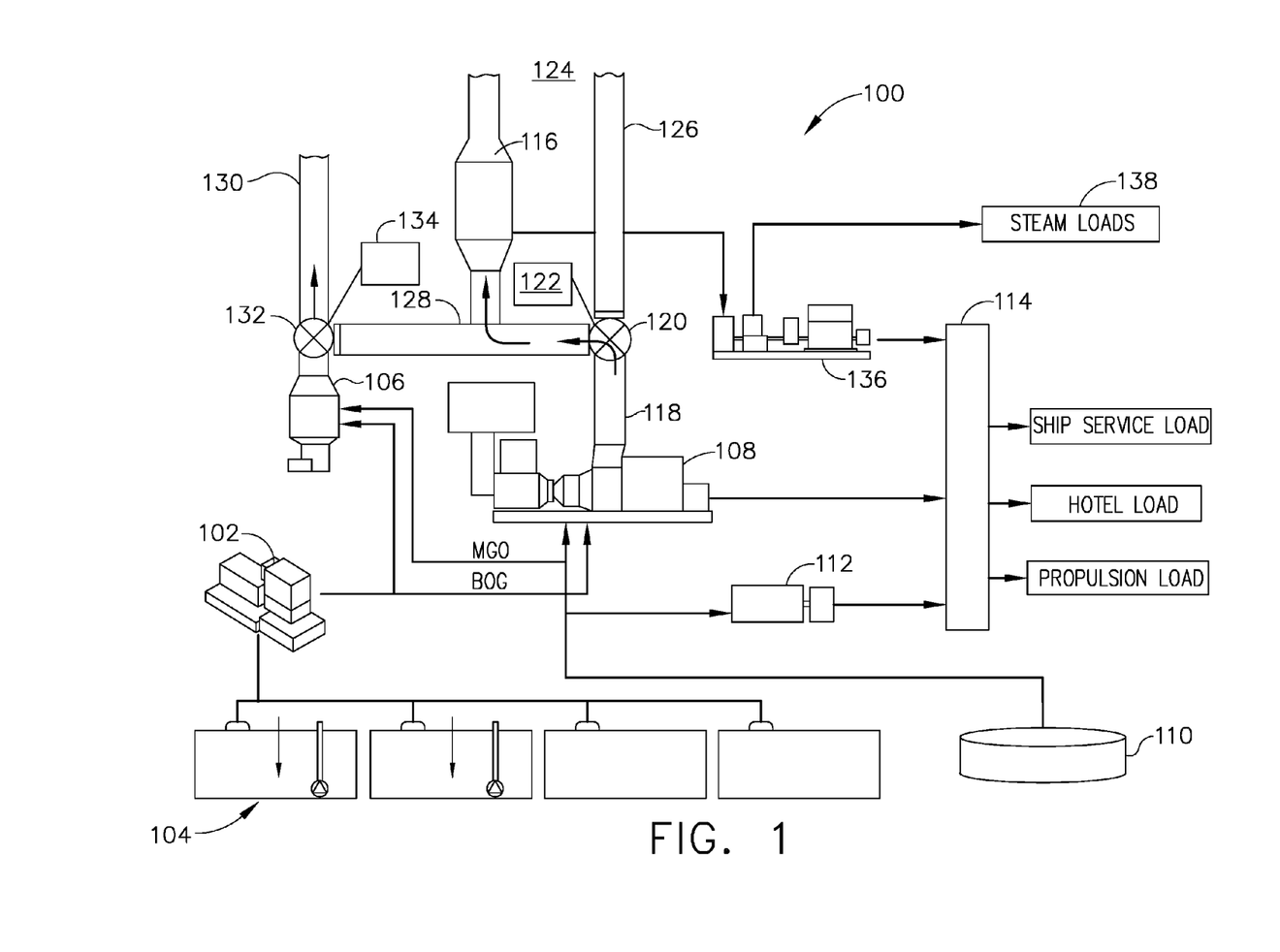
FIG. 1 is a schematic illustration of a gas turbine-based combined gas turbine electric and steam (COGES) system.

FIG. 1 is a schematic illustration of a gas turbine-based combined gas turbine electric and steam system 100. Although illustrated as being gas turbine-based, electric and steam system 100 may also be based on other electrical generating technology, such as, but not limited to diesel engines. In the example embodiment, electric and steam system 100 is configured to supply shipboard electrical and propulsion needs for a liquefied natural gas (LNG) carrier ship.

Electric and steam system 100 includes a burn-off gas (BOG) compressor 102 configured to receive BOG from one or more LNG storage tanks 104. Compressed BOG is channeled to a dual-fuel gas combustion unit (GCU) 106 and a dual-fuel gas turbine engine-generator GTG 108. Additionally, GCU 106 can also burn "free flow" or uncompressed boil off gas flow.

Electric and steam system 100 includes a marine gas oil (MGO) system 110 configured to channel MGO to a startup liquid fuel diesel generator 112 configured to supply shipboard electrical loads during off-normal operations. Marine gas oil (MGO) system 110 is also configured to channel MGO to GCU 106 and GTG 108. Although described as MGO, the second fuel of the dual-fuel supply to GCU 106 and GTG 108 may be a variety of other fuels and fuel types.

In addition to supplying electrical power directly to a shipboard electrical distribution system 114, GTG 108 also supplies a heat recovery steam generator (HRSG) 116 with a high temperature exhaust stream through an exhaust duct 118. Exhaust duct 118 includes a GTG exhaust diverter valve 120 controlled by a GTG exhaust diverter valve controller 122. GTG exhaust diverter valve 120 is configured to modulate an amount of GTG exhaust flow to HRSG 116 and ambient 124 through an HRSG bypass stack 126. GTG exhaust is channeled to HRSG 116 through a crossover duct 128. Under certain conditions, GTG 108 is not able to consume all of the NBOG generated by LNG storage tanks 104. During such conditions, an alternate path for the NBOG to GCU 106 is used. GCU 106 oxidizes the NBOG, generating a stream of hot GCU exhaust gases that is channeled to ambient 124 through a GCU stack 130 or to crossover duct 128 through a GCU exhaust diverter valve 132, which is controlled by a GCU exhaust diverter valve controller 134. Accordingly, HRSG 116 can be supplied by hot exhaust gases from GTG 108 and/or GCU 106 through crossover duct 128 and each stream of hot exhaust gases is controlled by respective diverter valves 120 and 132. Under other conditions it may be desirable to be able to generate more steam than is possible to generate using NBOG processed through GTG 108 and/or GCU 106. In this case, FBOG may be used to fuel GCU 106, such as on the ballast voyage when NBOG flow may not be sufficient to allow the STG 136 to reach full power.

Diverter valves 120 and 132 are controlled by respective controllers 122 and 134. Although described as individual stand-alone controllers, controllers 122 and 134 may be combined into a single controller or may be embodied within a larger power plant control system. Diverter valves 120 and 132 are controlled by respective controllers 122 and 134 to ensure GCU exhaust gas channeled to HRSG 134 provides sufficient back pressure to ensure a stable and balanced flow of exhaust gases from GCU 106 to the HRSG 116 under all operating conditions.

HRSG 116 is configured to generate steam from the hot exhaust gases from GTG 108 and/or GCU 106 and supplied through crossover duct 128. The generated steam is channeled to a steam turbine generator (STG) 136 configured to generate electrical power, which is directed to shipboard electrical distribution system 114. A first portion of the depleted steam from STG 136 is channeled to one or more shipboard steam loads 138. Ship heating steam may be derived from a reducing valve located upstream of the steam turbine (steam flow less than approximately 85%) or from extraction steam (depleted steam) taken from the steam turbine (power >85%). A second portion of the depleted steam from STG 136 is condensed in a condenser and recycled back to HRSG 116 through a condensate system (not shown) and a feed water system (not shown).

During operation, electric and steam system 100 includes seven fundamental operating modes based at least on a total power demand, available operating equipment, operating environment and an electric plant configuration. Sub-modes of each of the seven fundamental operating modes take into account different fuel supplies (liquid or gas), emissions requirements, and a potential use of the black start emergency diesel to increase power.

Figure 2:
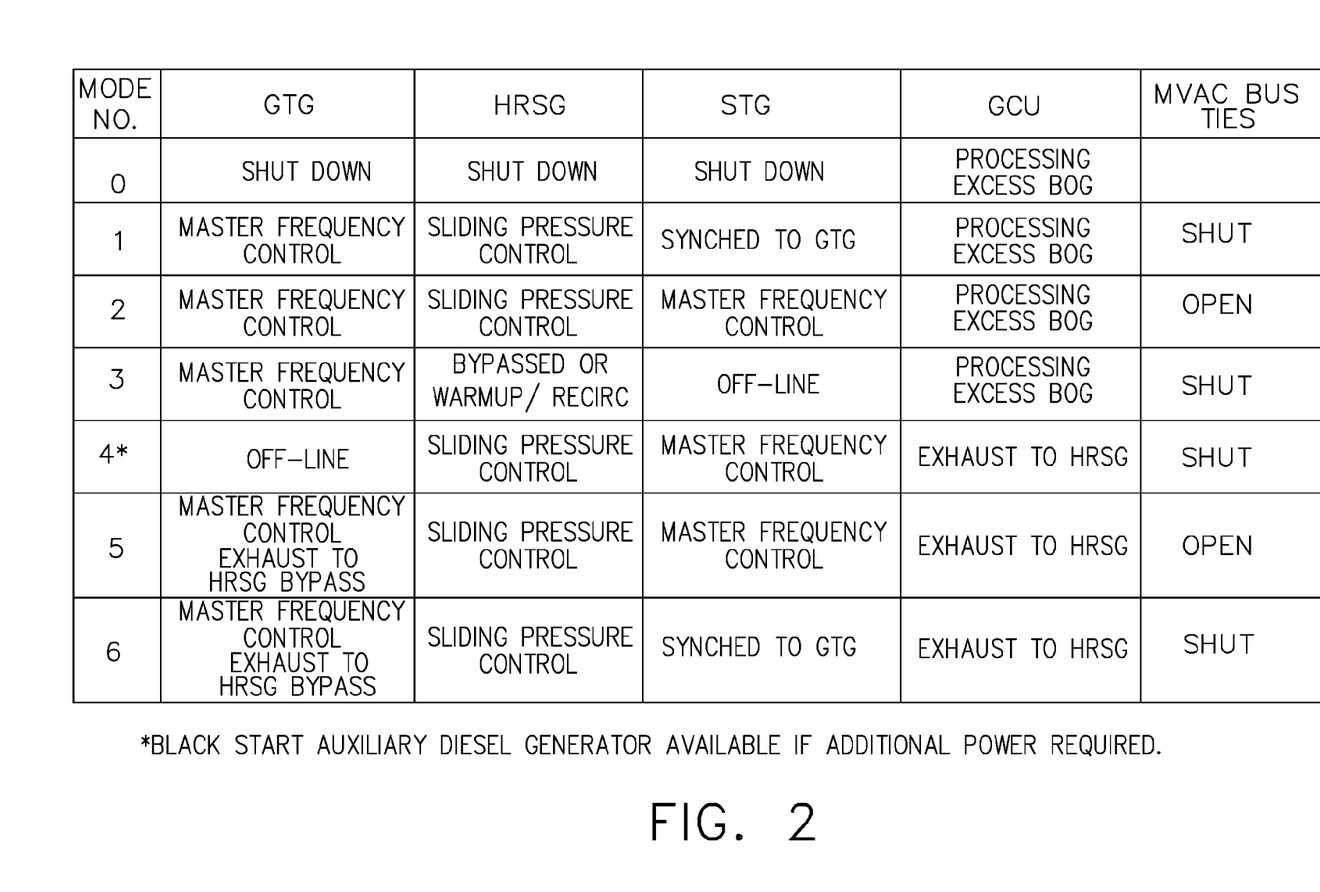
FIG. 2 is a table illustrating the operating modes of the major equipment of the electric and steam system shown in FIG. 1.

FIG. 2 is a table illustrating the operating modes of the major equipment of electric and steam system 100 (shown in FIG. 1).

The fundamental operating modes are:

Plant Shut Down (Mode 0): Electric and steam system 100 is shut down. Ship electric power supplied from an auxiliary diesel generator and/or the ship's emergency diesel generator, or from shore power. Shore power and the emergency diesel generator are typically connected to the emergency switchgear. Loads not directly fed from the emergency switchgear are supplied by feeding power back through the low voltage bus feeder breakers to the ship service low voltage distribution system.

GTG and STG Combined Cycle Parallel Electric Plant Operation (Mode 1): In this mode, total ship power demand may be greater than approximately 25% of rated power (required to sustain combined cycle operation). In other embodiments, total ship power demand may be as low as 10%. The MVAC bus tie breakers are shut. Both GTG 108 and STG 136 generators are tied together through the MVAC bus tie breakers to a common load. GTG 108 operates in, for example, an isochronous mode, setting the frequency for the ship distribution system. STG 136 generator operates in parallel with GTG 108 generator. In this mode, STG 136 speed is controlled by GTG 108. In one embodiment, HRSG 116 uses sliding pressure control. STG 136 throttle is wide open, not controlling, and STG 136 assumes as much load as possible and still remain synchronized with GTG 108. GTG 108 responds first to changes in load. The new load then redistributes between GTG 108 and STG 136 as the change in GTG exhaust characteristics change the available steam to STG 136 changes, eventually establishing a new equilibrium load distribution. In other embodiments, HRSG 116 uses setpoint control.

GTG and STG Combined Cycle Split Electric Plant Operation (Mode 2): Total ship power demand is greater than, for example, approximately 25% of rated power (required to sustain combined cycle operation). The MVAC bus tie breakers are open. Each generator supplies one "side" of the electric plant and sees a unique load. There is no load sharing. As a result, each generator operates to control its own speed/frequency. STG 136 throttle is engaged to control steam admission to the turbine. The gas turbine fuel metering valve controls GTG output. Each turbine responds to the load demand transients on its "side" of the electric plant. Total power available is ~28.5 MW, assuming the electric load is distributed between sides in proportion to the generator ratings. STG output may be limited by GTG output.

GTG Simple Cycle (Mode 3): GTG 108 carries the full ship load. The medium voltage alternating current (MVAC) bus tie breakers are generally shut unless only one side of the electric plant is used or the black start diesel may be used to power the other side. The gas turbine exhaust can be directed to the HRSG bypass stack or through the HRSG. If the latter, the steam plant feed system and condenser must be on line to maintain circulation and prevent steam plant high pressure and over heating of the HRSG heat exchanger tubes, unless the HRSG is designed to run dry. GTG 108 operates in isochronous mode.

STG Bottoming Cycle with GCU Heat Source (Mode 4): STG 136 carries the full ship load. Total power limited to ~8.5 MW. GTG 108 is off-line. The GCU exhaust serves as the heat source to the HRSG. Its exhaust gas temperatures can be controlled to approximate gas turbine exhaust gas temperatures. STG 136 operates in isochronous mode. This is the primary backup mode when GTG 108 trips or is out of service.

High Redundancy Split Electric Plant (Mode 5): This mode is the same as GTG 108 and STG 136 Combined Cycle Split Electric Plant Operation mode except the diverter valve alignment directs the gas turbine exhaust to the HRSG bypass stack. The GCU diverter valves direct the GCU exhaust to the HRSG to serve as the steam generation heat source. The MVAC bus tie breakers are open. Both GTG 108 and STG 136 operate in isochronous mode. This operating mode provides two completely independent electric plants for the ship. A power interruption to either generator will not affect the other generator. Total power available is ~28.5 MW, assuming the electric load is distributed between sides in proportion to the generator ratings.

High Redundancy Parallel Electric Plant Operation (Mode 6): Same as Mode 5 except MVAC bus tie breakers are shut and the GTG controls bus frequency. This enhances load sharing in a highly redundant operating configuration.

At power levels experienced in port during crew rest, provisioning or bunkering (less than 2.5 to 3.0 MW), the crew could also choose to use the black start auxiliary diesel generator as the ship's source of power (Mode 0). The following table summarizes the fundamental operating modes and component control mode.

Figure 3:
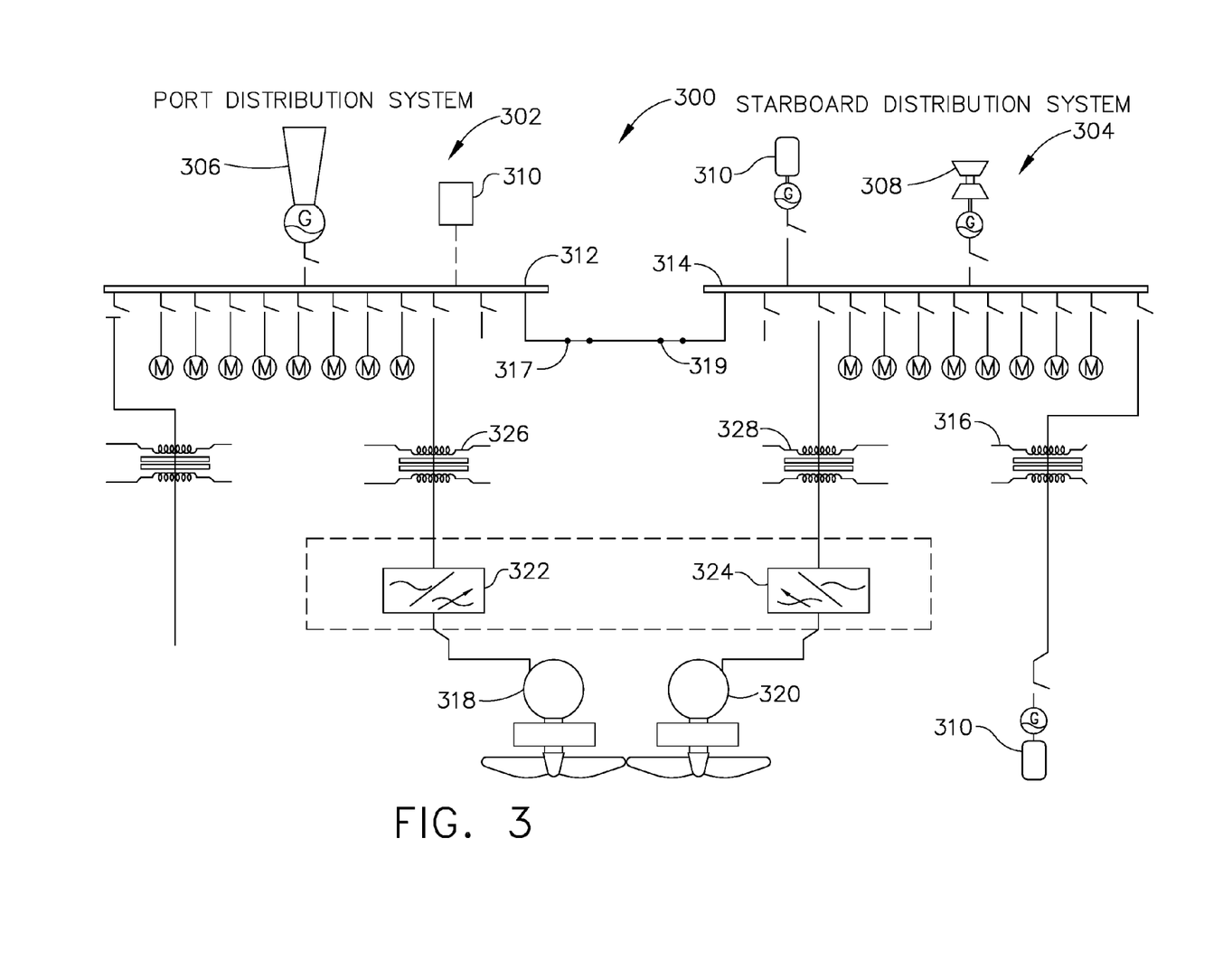
FIG. 3 is a schematic diagram of the shipboard electrical system including a port electrical distribution system and a starboard electrical distribution system.

FIG. 3 is a schematic diagram of the shipboard electrical system 300 including a port electrical distribution system 302 and a starboard electrical distribution system 304. Port electrical distribution system 302 includes a gas turbine engine generator (GTG) 306 and starboard electrical distribution system 304 includes a steam turbine generator 308 driven by steam generated from the exhaust stream of GTG 306 or the GCU 106. An auxiliary diesel generator 310 may be coupled directly to one of port electrical distribution system 302 or starboard electrical distribution system 304 through a respective MVAC bus 312 or 314, or may be coupled to MVAC buses 312 or 314 through a step-up transformer 316. MVAC buses are electrically couplable through one or more MVAC bus tie breakers 317 and 319. Propulsion motors 318 and 320 are supplied from respective variable frequency drives (VFD) 322 and 324. VFDs 322 and 324 are fed from respective buses 312 and 314 through respective transformers 326 and 328.

Figure 4:
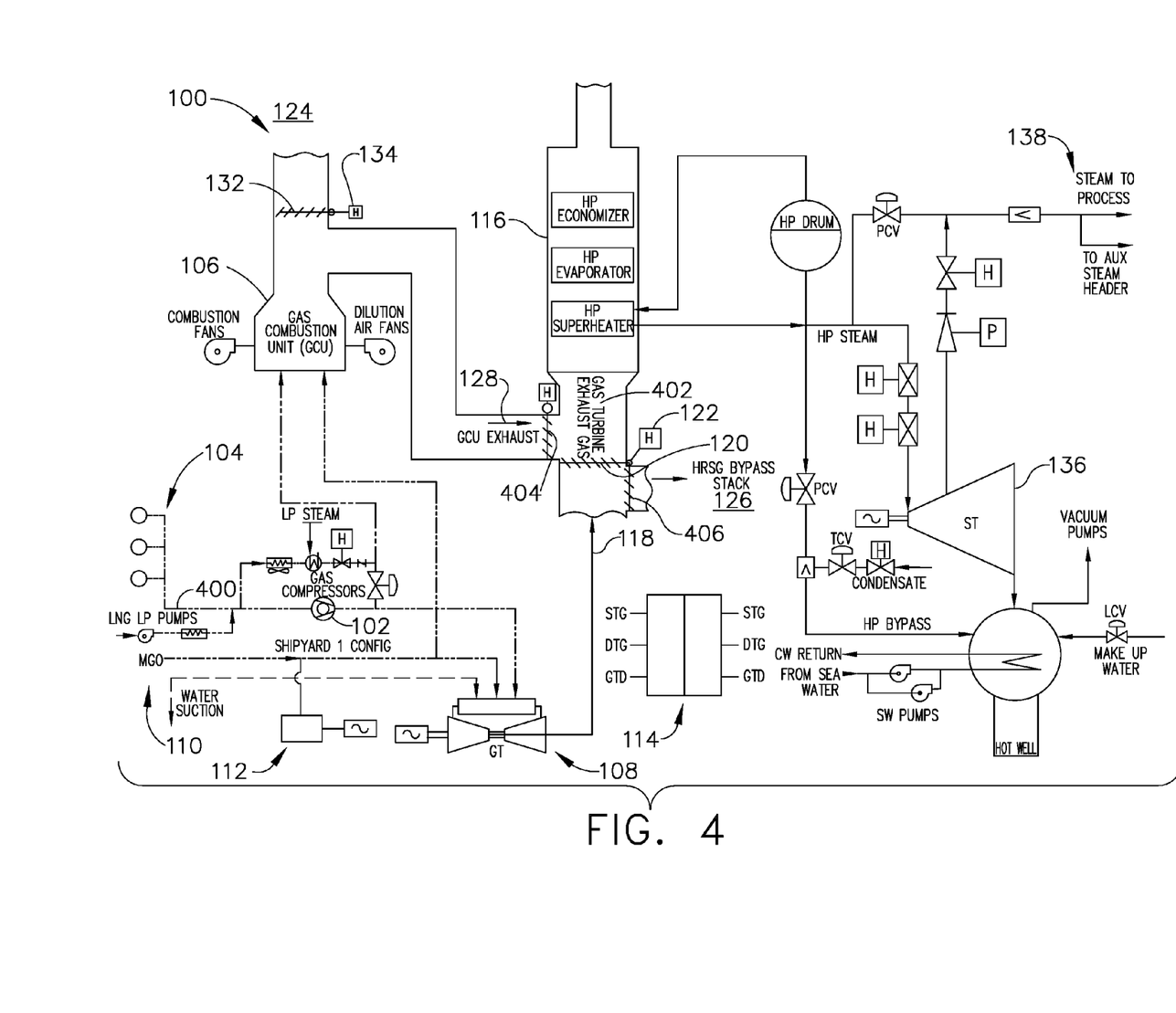
FIG. 4 is a single line schematic diagram of electric and steam system shown in FIG. 1.

FIG. 4 is a single line schematic diagram of electric and steam system 100 in accordance with an exemplary embodiment of the present invention. In the exemplary embodiment, a flow 400 of boil off gas is channeled to BOG compressor 102. A discharge of BOG compressor 102 is channeled to GCU 106 and GTG 108. GTG 108 converts the compressed BOG into useful electrical energy while any BOG not able to be used by GTG 108 is oxidized in a controlled manner to limit regulated gases and the byproducts are discharged to ambient 124 by GCU 106. Crossover duct 128 is configured to receive a first flow of exhaust gas from electrical generator assembly, GTG 108 and a second flow of exhaust gas from oxidizing unit 106 and channel the first and second flows to an inlet 402 of heat recovery steam generator (HRSG) 116. Crossover duct 128 permits exhaust gas flow from GTG 108 and exhaust gas flow from GCU 106 to be selectably channeled to HRSG 116. In addition to GTG exhaust diverter valve 120 and GCU exhaust diverter valve 132, two other valves are used in conjunction with crossover duct 128 to control exhaust gas flow to HRSG 116. A crossover duct shutoff valve 404 is configured to isolate exhaust gases from GCU 106 from entering HRSG 116. An HRSG stack bypass valve 406 is configured to divert exhaust gases from GTG 108 to ambient 124 rather than entering HRSG 116.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electric and steam system comprising:
    an electrical generator assembly configured to receive a first portion of a flow of boil off gas (BOG);
    an oxidizing unit configured to receive a second portion of the flow of the boil off gas (NBOG), the second portion being the flow of the BOG stream that exceeds at least one of a demand of the electrical generator and a capability of the electrical generator;
    a crossover duct configured to receive a first flow of exhaust gas from the electrical generator assembly and a second flow of exhaust gas from the oxidizing unit and channel at least one of the first and second flows to an inlet of a heat recovery steam generator.

2. The system of claim 1, further comprising a controller configured to control at least one of the first and second flow using a respective diverter valve.

3. The system of claim 1, further comprising a controller configured to control a back pressure of the second flow to promote exhaust gas flow through the heat recovery steam generator.

4. The system of claim 1, wherein said electric and steam system is positioned onboard a floating vessel.

5. The system of claim 4, wherein said heat recovery steam generator is configured to supply steam to a steam turbine electrical generator assembly and a heating steam system of the vessel.

6. The system of claim 1, wherein said electric and steam system is positioned onboard an LNG carrier vessel.

7. The system of claim 1, wherein said electrical generator assembly and said oxidizing unit are configured to burn a plurality of different fuels.

8. A method of operating an electrical generation system comprises:
    generating electrical energy using a first portion of a flow of a boil off gas (BOG) stream from a stored volume of liquefied natural gas (LNG) to fuel an electrical generator;
    oxidizing a second portion of the flow of the BOG stream, the second portion being the flow of the BOG stream that exceeds at least one of a demand of the electrical generator and a capability of the electrical generator; and
    channeling a first flow of exhaust gas from the electrical generator assembly or a second flow of exhaust gas from an oxidizing unit through a crossover duct to an inlet of a heat recovery steam generator.

9. The system of claim 8, wherein channeling a first flow of exhaust gas from the electrical generator assembly and a second flow of exhaust gas from the oxidizing unit through a crossover duct to an inlet of a heat recovery steam generator comprises controlling at least one of the first and second flow using a respective diverter valve positioned upstream from the crossover duct.

10. The system of claim 8, wherein channeling a first flow of exhaust gas from the electrical generator assembly or a second flow of exhaust gas from the oxidizing unit through a crossover duct to an inlet of a heat recovery steam generator comprises controlling a position of at least one of the GTG exhaust diverter valves and a back pressure of the second flow to promote GCU exhaust gas flow through the heat recovery steam generator.

11. The system of claim 8, further comprising operating the electrical generation system positioned onboard a floating vessel.

12. The system of claim 8, further comprising operating the electrical generation system positioned onboard an LNG carrier vessel.

13. The system of claim 8, wherein generating electrical energy comprises generating electrical energy by an electrical generator assembly burning a plurality of different fuels and oxidizing comprises a plurality of different fuels using an oxidizing unit.

14. The system of claim 8, further comprising supplying steam to a steam turbine electrical generator assembly from the heat recovery steam generator.

15. A shipboard electric and steam system comprising:
    a powered floating vessel;
    an electrical generator assembly configured to receive a first portion of a flow of a boil off gas (NBOG) from the powered floating vessel;
    an oxidizing unit configured to receive a second portion of the flow of the boil off gas (NBOG) from the powered floating vessel, the second portion being the flow of the BOG stream that exceeds at least one of a demand of the electrical generator and a capability of the electrical generator; and a crossover duct configured to receive a first flow of exhaust gas from the electrical generator assembly and a second flow of exhaust gas from the oxidizing unit and channel the first and second flows to an inlet of a heat recovery steam generator.

16. The system of claim 15, further comprising a controller configured to control at least one of the first and second flow using a respective diverter valve.

17. The system of claim 15, further comprising a controller configured to control a back pressure of the first and second flows to promote exhaust gas flow through the heat recovery steam generator.

18. The system of claim 15, wherein said powered floating vessel is embodied in an LNG carrier vessel.

19. The system of claim 15, wherein said electrical generator assembly and said oxidizing unit are configured to burn a plurality of different fuels.

20. The system of claim 15, wherein said heat recovery steam generator is configured to supply steam to a steam turbine electrical generator assembly.

* * * * *